(12) United States Patent
Yang (10) Patent No.: US 12,130,517 B2
(45) Date of Patent: Oct. 29, 2024

(54) BACKLIGHT MODULE AND DISPLAY MODULE

(71) Applicant: WUHAN CHINA STAR OPTOELECTRONICS TECHNOLOGY CO., LTD., Wuhan (CN)

(72) Inventor: Yong Yang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/790,273

(22) PCT Filed: Jun. 29, 2022

(86) PCT No.: PCT/CN2022/102282
§ 371 (c)(1),
(2) Date: Jun. 30, 2022

(87) PCT Pub. No.: WO2023/236280
PCT Pub. Date: Dec. 14, 2023

(65) Prior Publication Data
US 2024/0176185 A1    May 30, 2024

(30) Foreign Application Priority Data
Jun. 9, 2022  (CN) .......................... 202210653534.9

(51) Int. Cl.
*G02F 1/00* (2006.01)
*G02F 1/1335* (2006.01)
*G02F 1/13357* (2006.01)

(52) U.S. Cl.
CPC .. *G02F 1/133605* (2013.01); *G02F 1/133603* (2013.01); *G02F 1/133606* (2013.01); *G02F 1/133611* (2013.01); *G02F 1/133614* (2021.01)

(58) Field of Classification Search
None
See application file for complete search history.

(56) References Cited

U.S. PATENT DOCUMENTS

| 10,707,390 B1 * | 7/2020 | Zha ......................... H10K 59/38 |
| 2012/0013811 A1 | 1/2012 | Shimizu |

(Continued)

FOREIGN PATENT DOCUMENTS

| CN | 2630893 Y | 8/2004 |
| CN | 101375095 A | 2/2009 |

(Continued)

OTHER PUBLICATIONS

PCT International Search Report for International Application No. PCT/CN2022/102282, mailed on Dec. 16, 2022, 10pp.

(Continued)

*Primary Examiner* — Gerald J Sufleta, II
(74) *Attorney, Agent, or Firm* — The Roy Gross Law Firm, LLC; Roy Gross (57) ABSTRACT

The present invention embodiment provides a backlight module and a display module. The backlight module includes a light emitting assembly, a color conversion layer, and a reflection function layer. The reflection function layer at least includes a first sublayer and a second sublayer. A refractive index of the first sublayer is less than a refractive index of the second sublayer. A light emitted by the color conversion layer to the reflection function layer includes a first light. A product of a thickness of the first sublayer and the refractive index of the first sublayer is equal to an integer multiple of a half wavelength of first light.

20 Claims, 5 Drawing Sheets

(56) References Cited

U.S. PATENT DOCUMENTS

| | | | | |
|---|---|---|---|---|
| 2014/0092584 | A1* | 4/2014 | Ono | H01L 33/58 362/296.01 |
| 2021/0288292 | A1* | 9/2021 | Zeng | H10K 50/844 |
| 2021/0373388 | A1* | 12/2021 | Wang | G02F 1/133617 |
| 2022/0050227 | A1 | 2/2022 | Radünz et al. | |
| 2022/0310974 | A1* | 9/2022 | Zhou | H10K 59/879 |

FOREIGN PATENT DOCUMENTS

| | | |
|---|---|---|
| CN | 101555993 A | 10/2009 |
| CN | 101743431 A | 6/2010 |
| CN | 103511925 A | 1/2014 |
| CN | 103855270 A | 6/2014 |
| CN | 107703676 A | 2/2018 |
| CN | 108303822 A | 7/2018 |
| CN | 109285469 A | 1/2019 |
| CN | 110242939 A | 9/2019 |
| CN | 111095088 A | 5/2020 |
| CN | 111208670 A | 5/2020 |
| CN | 112305806 A | 2/2021 |
| CN | 114063347 A | 2/2022 |
| CN | 114089561 A | 2/2022 |
| IN | 111667777 A | 9/2020 |

OTHER PUBLICATIONS

PCT Written Opinion of the International Search Authority for International Application No. PCT/CN2022/102282, mailed on Dec. 16, 2022, 9pp.

Chinese Office Action issued in corresponding Chinese Patent Application No. 202210653534.9 dated Mar. 25, 2023, pp. 1-7, 18pp.

Chinese Office Action issued in corresponding Chinese Patent Application No. 202210653534.9 dated May 4, 2023, pp. 1-7, 16pp.

\* cited by examiner

BACKLIGHT MODULE AND DISPLAY MODULE

This application is a National Phase of PCT Patent Application No. PCT/CN2022/102282 having International filing date of Jun. 29, 2022, which claims the benefit of priority of Chinese Patent Application No. 202210653534.9, filed Jun. 9, 2022, the contents of which are all incorporated herein by reference in their entirety.

FIELD OF INVENTION

The present application relates to a field of displays, especially relates to a backlight module and a display module.

BACKGROUND OF INVENTION

In recently years, a backlight module has gradually developed toward thinning. At present, for improvement of a light emission rate, thicker optical films are used, and assembling is complicated to result in failure of balance between a thickness and a light emission rate of a backlight module and fail to achieve a super thin backlight module with a high light emission rate.

Therefore, a backlight module and a display module are urgently needed for solve the above technical issue.

SUMMARY OF INVENTION

Technical Issue

The present invention provides a backlight module and a display module that can ease a technical issue of failure of balance between a thickness and a light emission rate of the conventional backlight module.

Technical Solution

To solve the above issue, technical solutions provided by the present application are as follows:

An embodiment of the present application provides a backlight module, including:
  a light emitting assembly including a plurality of light emitting chips;
  a color conversion layer located on a side of the light emitting assembly; and
  a reflection function layer located between the light emitting assembly and the color conversion layer, wherein the reflection function layer at least includes a first sublayer and a second sublayer, and the second sublayer is located between the first sublayer and the light emitting assembly;
  wherein light emitted by the color conversion layer to the reflection function layer includes a first light, a refractive index of the first sublayer is less than a refractive index of the second sublayer, and a product of a thickness of the first sublayer and the refractive index of the first sublayer is equal to an integer multiple of a half wavelength of the first light.

Preferably, the reflection function layer further includes a third sublayer located on a side of the second sublayer away from the color conversion layer; the refractive index of the second sublayer is different from a refractive index of the third sublayer; wherein the first sublayer includes a first surface located near the color conversion layer, first reflective lights include the first lights reflected by one or more of surfaces of the first sublayer, the second sublayer, and the third sublayer and emitted out from the first surface, at least some of the first reflective lights have peaks at least partially overlapping one another, or at least some of the first reflective lights have valleys at least partially overlapping one another.

Preferably, the reflection function layer further includes a fourth sublayer located on a side of the third sublayer away from the color conversion layer, a refractive index of the fourth sublayer is different from the refractive index of the third sublayer; and wherein the light emitted by the color conversion layer to the reflection function layer further includes second lights, a color of the second lights is different from a color of the first light, second reflective lights include the second lights reflected by surfaces of one or more of the first sublayer, the second sublayer, the third sublayer, and the fourth sublayer and emitted out from the first surface, at least some of the second reflective lights have peaks at least partially overlapping one another, or at least some of the second reflective lights have valleys at least partially overlapping one another.

Preferably, the light emitted by the color conversion layer to the reflection function layer further includes third light, a color of the third light is different from the color of the first light, the color of the third light is different from the color of the second lights, the color of the third light is the same as a light emitting color of the light emitting chips; and wherein a transmittance of the reflection function layer relative to the first light is less than or equal to 1%, a transmittance of the reflection function layer relative to the second lights is less than or equal to 1%, and a transmittance of the reflection function layer relative to the third light is greater than or is equal to 85%.

Preferably, the color of the first light is green, the color of the second lights is red, and the color of the third light is blue.

Preferably, the refractive index of the first sublayer is the same as a refractive index of the third sublayer, and a refractive index of the second sublayer is the same as the refractive index of the fourth sublayer.

Preferably, the light emitting assembly further includes a light reflection barrier wall between adjacent two of the light emitting chips, and a height of the light reflection barrier wall is greater than a height of the light emitting chip.

Preferably, the backlight module further includes an encapsulation layer located between the light emitting assembly and the reflection function layer and a light adjustment layer located between the encapsulation layer and the reflection function layer; and wherein the light adjustment layer includes a plurality of light adjustment units and filling units each of which is located between adjacent two of the light adjustment units, one of the light adjustment units corresponds to one of the light emitting chips, and a refractive index of the filling unit is the same as a refractive index of the encapsulation layer.

Preferably, the light adjustment units includes a plurality of open holes, and a light reflectivity of the light adjustment unit ranges from 70% to 95%.

Preferably, along a direction from an edge of the light adjustment unit to a center of the light adjustment unit, diameters of the open holes gradually decrease.

Preferably, the light emitting chips at least partially overlap the light adjustment units, a transmittance of the light adjustment unit ranges from 5% to 10%.

Preferably, the backlight module further includes a light converging layer located on a side of the color conversion layer away from the light emitting assembly; and the light converging layer includes a plurality of pyramid units, a bottom surface of the pyramid units is located near a side the color conversion layer.

The embodiment of the present application also provides a display module, including a backlight module, and a display panel disposed on a light exiting side of the backlight module;

wherein the backlight module includes:
a light emitting assembly including a plurality of light emitting chips;
a color conversion layer located on a side of the light emitting assembly; and
a reflection function layer located between the light emitting assembly and the color conversion layer, wherein the reflection function layer at least includes a first sublayer and a second sublayer, and the second sublayer is located between the first sublayer and the light emitting assembly;
wherein light emitted by the color conversion layer to the reflection function layer includes a first light, a refractive index of the first sublayer is less than a refractive index of the second sublayer, and a product of a thickness of the first sublayer and the refractive index of the first sublayer is equal to an integer multiple of a half wavelength of the first light.

Preferably, the reflection function layer further includes a third sublayer located on a side of the second sublayer away from the color conversion layer; the refractive index of the second sublayer is different from a refractive index of the third sublayer; and wherein the first sublayer includes a first surface located near the color conversion layer, first reflective lights include the first lights reflected by one or more of surfaces of the first sublayer, the second sublayer, and the third sublayer and emitted out from the first surface, at least some of the first reflective lights have peaks at least partially overlapping one another, or at least some of the first reflective lights have valleys at least partially overlapping one another.

Preferably, the reflection function layer further includes a fourth sublayer located on a side of the third sublayer away from the color conversion layer, a refractive index of the fourth sublayer is different from the refractive index of the third sublayer; and wherein the light emitted by the color conversion layer to the reflection function layer further includes second lights, a color of the second lights is different from a color of the first light, second reflective lights include the second lights reflected by surfaces of one or more of the first sublayer, the second sublayer, the third sublayer, and the fourth sublayer and emitted out from the first surface, at least some of the second reflective lights have peaks at least partially overlapping one another, or at least some of the second reflective lights have valleys at least partially overlapping one another.

Preferably, the light emitted by the color conversion layer to the reflection function layer further includes third light, a color of the third light is different from the color of the first light, the color of the third light is different from the color of the second lights, the color of the third light is the same as a light emitting color of the light emitting chips; and wherein a transmittance of the reflection function layer relative to the first light is less than or equal to 1%, a transmittance of the reflection function layer relative to the second lights is less than or equal to 1%, and a transmittance of the reflection function layer relative to the third light is greater than or is equal to 85%.

Preferably, the color of the first light is green, the color of the second lights is red, and the color of the third light is blue.

Preferably, the refractive index of the first sublayer is the same as a refractive index of the third sublayer, and a refractive index of the second sublayer is the same as the refractive index of the fourth sublayer.

Preferably, the light emitting assembly further includes a light reflection barrier wall between adjacent two of the light emitting chips, and a height of the light reflection barrier wall is greater than a height of the light emitting chip.

Preferably, the backlight module further includes an encapsulation layer located between the light emitting assembly and the reflection function layer and a light adjustment layer located between the encapsulation layer and the reflection function layer; and wherein the light adjustment layer includes a plurality of light adjustment units and filling units each of which is located between adjacent two of the light adjustment units, one of the light adjustment units corresponds to one of the light emitting chips, and a refractive index of the filling unit is the same as a refractive index of the encapsulation layer.

Advantages

The present invention, by setting a relation between the first light and a thickness and a refractive index of the reflection function layer, enhances reflectivity of the first light, increases a light emission rate, improves a light use rate, balances the thickness and the light emission rate of the backlight module, and improves a display effect.

DETAILED DESCRIPTION OF PREFERRED EMBODIMENTS

The present application provides a backlight module and a display module. To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

The embodiment of the present application provides a backlight module and a display module, which are described in detail respectively as follows. It should be explained that the order of descriptions in the following embodiments is not to limit the preferred order of the embodiments.

With reference to FIGS. 1 to 6, the present invention embodiment provides a backlight module 100, includes:
- a light emitting assembly 300 including a plurality of light emitting chips 310;
- a color conversion layer 700 located on a side of the light emitting assembly 300;
- a reflection function layer 600 located between the light emitting assembly 300 and the color conversion layer 700, wherein the reflection function layer 600 at least includes a the first sublayer 610 and a the second sublayer 620, and the second sublayer 620 is located between the first sublayer 610 and the light emitting assembly 300;
- wherein the reflection function layer 600 is configured to reflect a first light 710 emitted from the color conversion layer 700 to the reflection function layer 600 direction, a refractive index of the first sublayer 610 is less than a refractive index of the second sublayer 620, a product of a thickness of the first sublayer 610 and the refractive index of the first sublayer 610 is equal to an integer multiple of a half wavelength of the first light 710.

The present invention, by setting a relation between the first light and a thickness and a refractive index of the reflection function layer, enhances reflectivity of the first light, increases a light emission rate, improves a light use rate, balances the thickness and the light emission rate of the backlight module, and improves a display effect.

Technical solutions of the present invention are described in combination with specific embodiments.

Figure 1:
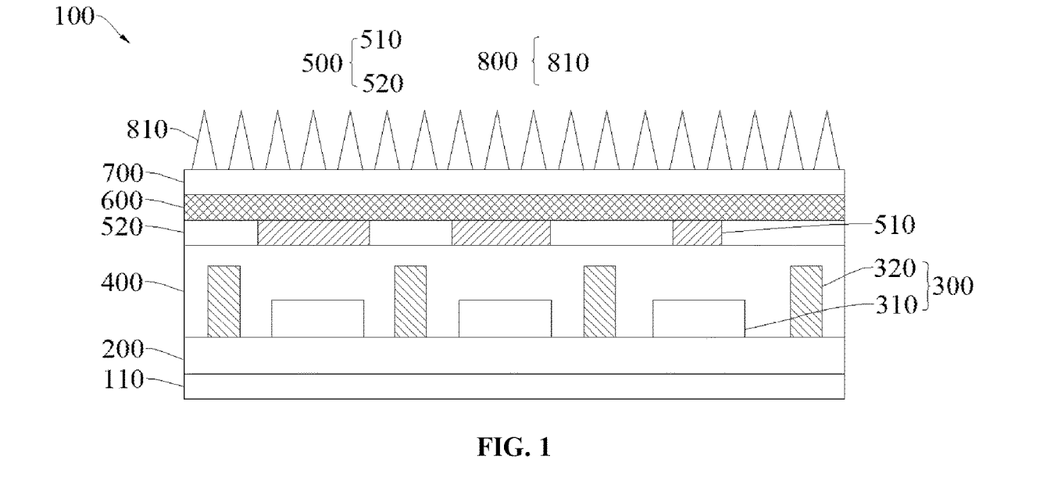
FIG. 1 is a schematic structural view of a first structure of a backlight module provided by the present invention embodiment.
Figure 2:
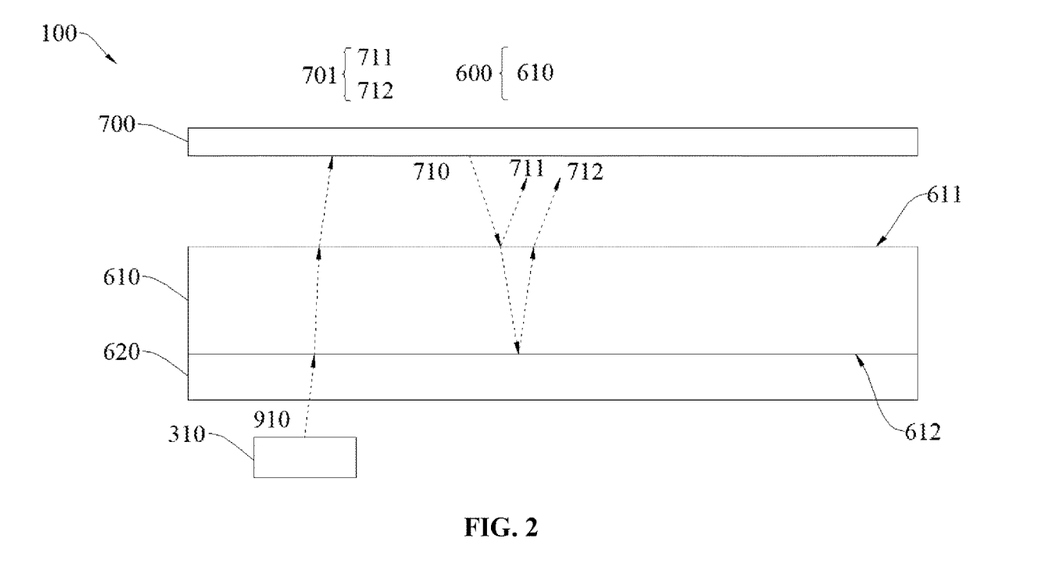
FIG. 2 is a schematic structural view of a second structure of the backlight module provided by the present invention embodiment.

In the present embodiment, with reference to FIGS. 1, and 2, the backlight module 100 includes a driver circuit layer 200, a light emitting assembly 300 located on a side of the driver circuit layer 200, a color conversion layer 700 located on a side of the light emitting assembly 300 away from the driver circuit layer 200, and a reflection function layer 600 located between the light emitting assembly 300 and the color conversion layer 700. The light emitting assembly 300 includes a plurality of light emitting chips 310, a light emitted by the light emitting chips 310 is a first color light 910. The reflection function layer 600 makes the first color light 910 pass through the reflection function layer 600, the reflection function layer 600 at least includes a first sublayer 610 and a second sublayer 620. The second sublayer 620 is located between the first sublayer 610 and the light emitting assembly 300. The refractive index of the first sublayer 610 is less than the refractive index of the second sublayer 620. The first sublayer 610 includes a first surface 611 located near a side of the color conversion layer 700 and a second surface 612 located near a side of the light emitting assembly 300.

The refractive index of the first sublayer 610 is less than the refractive index of the second sublayer 620. A product of the thickness of the first sublayer 610 $d_1$ and the refractive index of the first sublayer 610 $n_1$ is equal to an integer multiple of a half wavelength ($\lambda_1/2$) of the first light 710

$$d_1 = \frac{m\lambda_1}{2n_1},$$

m is a positive integer.

The color conversion layer 700 converts the first color light 910 at least to a second color light, and a wavelength of the second color light is greater than a wavelength of the first color light 910.

For convenience of understanding, it is described in detail as follows. The reflection function layer 600 is configured to reflect the first light 710 emitted by the color conversion layer 700 to the reflection function layer 600 direction to form a functional reflective light 701 emitted from a light exiting side of the backlight module 100. A color of the first light 710 is the same as a color of the second color light. The functional reflective light 701 includes a first sub-light 711 being a part of the first light 710 reflected by the first surface 611 and a second sub-light 712 being a part of the first light 710 reflected by the second surface 612 and emitted out from the first surface 611. At least some peaks of the first sub-light 711 overlap at least some peaks of the second sub-light 712, or at least some valleys of the first sub-light 711 overlaps at least some valleys of the second sub-light 712.

The wavelength of the first color light 910 is less than the wavelength of the second color light, the first color light 910 has stronger penetration. A light emission rate of the first color light 910 is greater. For the second color light with a shorter frequency, it has a greater probability returning to the reflection function layer 600. By at least disposing the first sublayer 610 to form a functional reflective light 701 guide out from the light exiting side of the backlight module 100, the functional reflective light 701 includes the first sub-light 711 being a part of the first light 710 reflected by the first surface 611 and the second sub-light 712 being a part of the first light 710 reflected by the second surface 612 and emitted out from the first surface 611. At least some peaks of the first sub-light 711 overlap at least some peaks of the second sub-light 712, or at least some valleys of the first sub-light 711 overlap at least some valleys of the second sub-light 712.

The first surface 611 can be a surface of the reflection function layer 600 located nearest the color conversion layer 700. A product of the thickness of the first sublayer 610 and the refractive index of the first sublayer 610 is equal to a integer multiple of a half wavelength of the first light 710. The first sub-light 711 and the second sub-light 712 interfere with and strengthen each other. According to energy conservation law, reflection that the reflection function layer 600 performs to the first light 710 is increased, transmission that the reflection function layer 600 performs to the first light 710 is reduced such that the first light 710, i.e., the light emission rate of the light with the same color of the second color light color, is increased to improve the light use rate, balance the thickness and the light emission rate of the backlight module 100, and improve the display effect.

Figure 3:
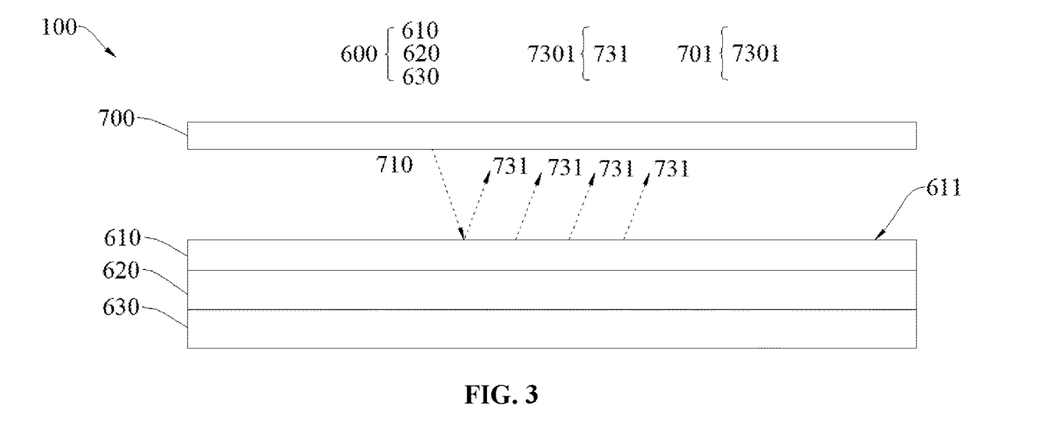
FIG. 3 is a schematic structural view of a third structure of the backlight module provided by the present invention embodiment.

In some embodiments, with reference to FIGS. 1 and 3, the reflection function layer 600 further includes a third sublayer 630 located on a side of the second sublayer 620 away from the color conversion layer 700. The refractive index of the second sublayer 620 is different from the refractive index of the first sublayer 610. The refractive index of the second sublayer 620 is different from the refractive index of the third sublayer 630. The first reflective light 7301 includes the first lights 710 reflected by one or more surfaces of the first sublayer 610, the second sublayer 620, and the third sublayer 630 and emitted out from the first surface 611. At least some of the first reflective lights 7301 have peaks at least partially overlapping one another, or at least some of the first reflective lights 7301 have valleys at least partially overlapping one another.

For convenience of understanding, in the figures, the functional reflective light 701 includes the first reflective light 7301, refines the first reflective light 7301 to include a plurality of first interference lights 731 emitted from the first surface 611. At least two of the first interference lights 731 with the same wavelength have peaks at least partially overlapping one another, or at least two of the first interference lights 731 with the same wavelength have valleys at least partially overlapping one another.

The first sublayer 610 and the second sublayer 620, when existing only, can reflect a certain second color light with a narrower wave band. By disposing the second sublayer 620 and the third sublayer 630 with different refractive indexes, in the reflection function layer 600, when including three layers, can reflect second color light with a wider wave band, which further improves the light emission rate of the light, improves the light use rate, balances the thickness and the light emission rate of the backlight module 100, and improves the display effect.

Figure 4:
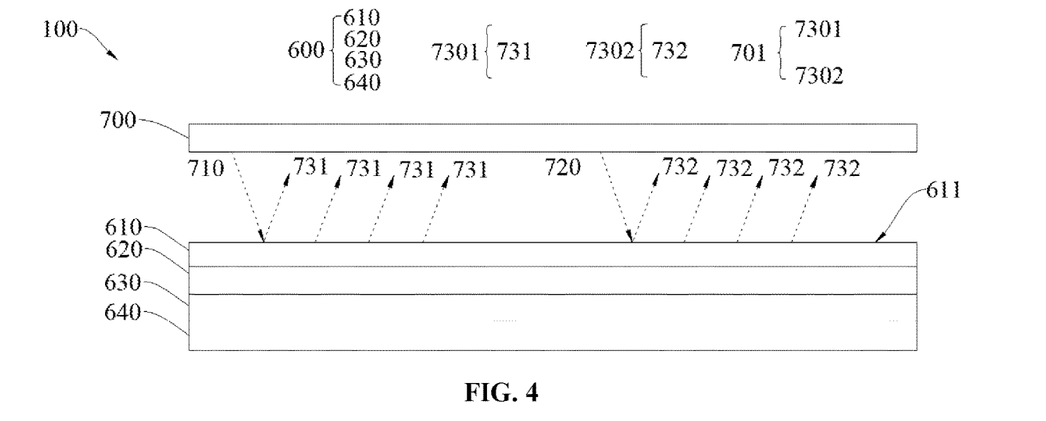
FIG. 4 is a schematic structural view of a fourth structure of the backlight module provided by the present invention embodiment.

In some embodiments, with reference to FIGS. 1 and 4, the reflection function layer 600 further includes a fourth sublayer 640. The fourth sublayer 640 is located on a side of the third sublayer 630 away from the color conversion layer 700. A refractive index of the fourth sublayer 640 is different from the refractive index of the third sublayer 630. A light emitted by the color conversion layer 700 to the reflection function layer 600 further includes a second lights 720. A color of the second lights 720 is different from the color of the first light 710. The second reflective lights 7302 includes the second lights 720 reflected by one or more surfaces of the first sublayer 610, the second sublayer 620, the third sublayer 630, and the fourth sublayer 640 and emitted out from the first surface 611. At least some of the second reflective lights 7302 have peaks at least partially overlapping one another, or at least some of the second reflective lights 7302 have valleys at least partially overlapping one another.

For convenience of understanding, in the figures, the functional reflective light 701 further includes the second reflective lights 7302, the second reflective lights 7302 are refined to include a plurality of second interference lights 732, emitted out from the first surface 611. At least two of the second interference lights 732 with the same wavelength have peaks at least partially overlapping one another, or at least two of the second interference lights 732 with the same wavelength have valleys at least partially overlapping one another.

The color conversion layer 700 also converts the first color light 910 to a third color light. A wavelength of the third color light is greater than the wavelength of the second color light. The reflection function layer 600, when including four layers or more than four layers, can reflect e second color light and the third color light with wider wave bands, which further improves the light emission rate of the light, improves the light use rate, balances the thickness and the light emission rate of the backlight module 100, and improves the display effect.

In some embodiments, materials of film layers with different refractive indexes in the reflection function layer 600 can be silicon oxide composite and/or silicon nitride composite In some embodiments, adjacent two refractive index film layers in the reflection function layer 600 can be alternately disposed lamination layers with high and low refractive indexes, a refractive index of the lamination layer with the higher refractive index can range from 1.5 to 2.0, and a refractive index of the lamination layer with the lower refractive index can range from 1.3 to 1.5.

In some embodiments, the color of the first light 710 is green, the color of the second lights 720 is red, and the color of the third light is blue.

The reflection function layer 600 preferentially reflects a green light, according to a higher sensitivity of human's eyes to the green light, the green light can better improve display brightness to improve the light emission rate and the display effect.

In some embodiments, a light emitted by the color conversion layer 700 to the reflection function layer 600 further includes a third light. The color of the third light is different from the color of the first light 710. The color of the third light is different from the color of the second lights 720. A light emitting color of the light emitting chips 310 is a single color. The color of the third light is the same as a light emitting color of the light emitting chip 310.

A transmittance of the reflection function layer 600 relative to the first light 710 is less than or equal to 1%, a transmittance of the reflection function layer 600 relative to the second lights 720 is less than or equal to 1%, and a transmittance of the reflection function layer 600 relative to the third light is greater than or is equal to 85%.

The reflection function layer 600 can reflect almost all of the green light and the red light and has a higher transmittance to the blue light, which not only has no influence to emission of the blue light of the light emitting assembly 300 but also improves the light emission rate of the green light and the red light to reduce brightness loss. Color calibration can be corrected by calculation without affecting display color precision.

In some embodiments, the refractive index of the first sublayer 610 is the same as the refractive index of the third sublayer 630, and the refractive index of the second sublayer 620 is the same as the refractive index of the fourth sublayer 640.

Sublayers of two refractive indexes are stacked to conveniently and quickly form the reflection function layer 600.

In some embodiments, a material of the reflection function layer 600 can be silicon nitride composite and/or silicon oxide composite In some embodiments, with reference to FIG. 1, the light emitting assembly 300 further includes a light reflection barrier wall 320 located between adjacent two of the light emitting chips 310. A height of the light reflection barrier wall 320 is greater than a height of the light emitting chip 310.

The light reflection barrier wall 320 can improve the light emission rate of the light emitting chips 310. The light reflection barrier wall 320 and the light emitting chips 310 are composed to form a light emitting chips 310 with approximating collimation, and the collimation light prevent optical waveguide loss.

In some embodiments, the light reflection barrier wall 320 is a high reflectivity material, a reflectivity of the light reflection barrier wall 320 ranges from 95% to 99.9%, and a height of the light reflection barrier wall 320 is greater than a height of the light emitting chips 310 by 0.3 mm to 0.5 mm.

In some embodiments, a ratio of a height to a width of the same light reflection barrier wall 320 is greater than or is equal to 1:2, which can make light have a better collimation effect, and the collimation light prevents optical waveguide loss.

A width of the light reflection barrier wall 320 is not less than half a distance between adjacent two of the light emitting chips 310. Preferably, the width of light reflection barrier wall 320 is not greater than 1 mm, and the distance between adjacent two of the light emitting chips 310 is not greater than 2 mm.

Preferably, the width of the light reflection barrier wall 320 is 60%-80% of the distance between the light emitting chips 310.

Figure 5:
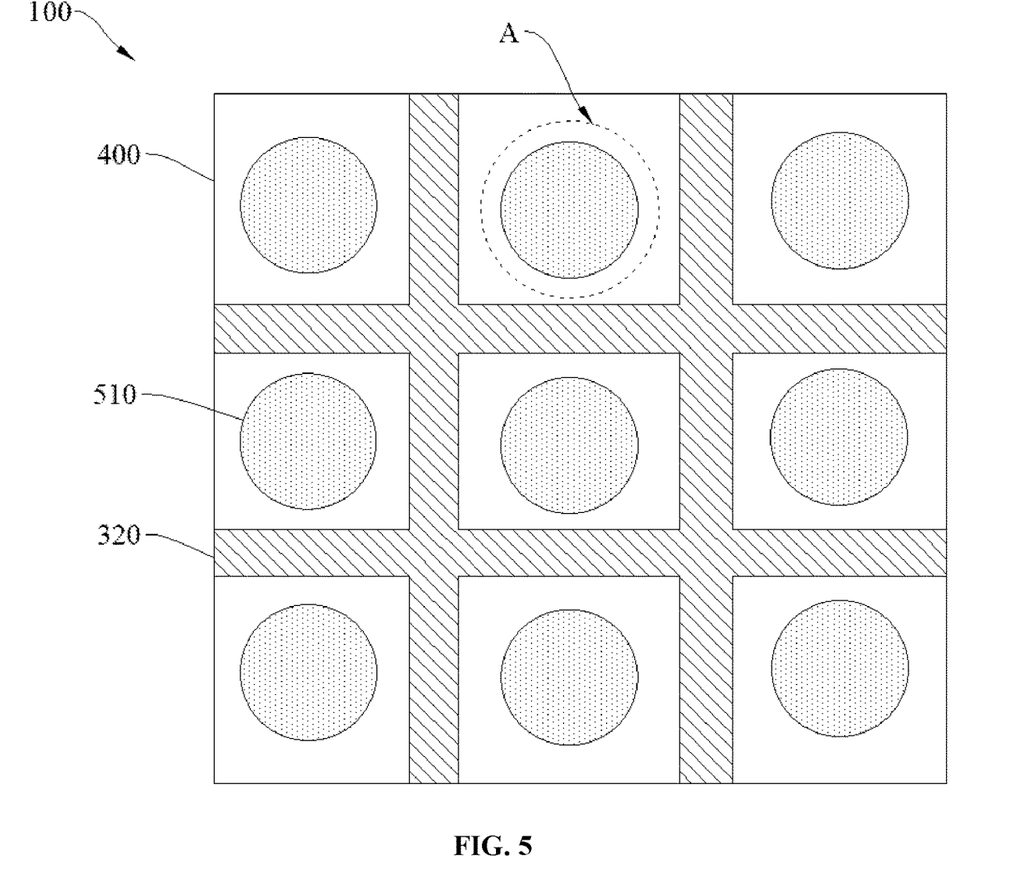
FIG. 5 is a schematic top view of a fifth structure of the backlight module provided by the present invention embodiment.

In some embodiments, with reference to FIGS. 1 and 5, the backlight module 100 further includes an encapsulation layer 400 located between the light emitting assembly 300 and the reflection function layer 600 and a light adjustment layer 500 located between the encapsulation layer 400 and the reflection function layer 600. The light adjustment layer 500 includes a plurality of light adjustment units 510 and filling units 520 each of which is located between adjacent two of the light adjustment units 510. One of the light adjustment units 510 corresponds to one of the light emitting chips 310. The light adjustment units 510 is configured to improve uniformity of light. A refractive index of the filling units 520 is the same as a refractive index of the encapsulation layer 400.

The encapsulation layer 400 is a transparent material, and a transmittance thereof ranges from 90% to 99%. The light adjustment layer 500 can evenly adjust the light of the light emitting chips 310 to improve uniformity of the light to further improve display uniformity. The refractive index of the filling units 520 is the same as the refractive index of the encapsulation layer 400, which can prevent light loss or light bias.

Figure 6:
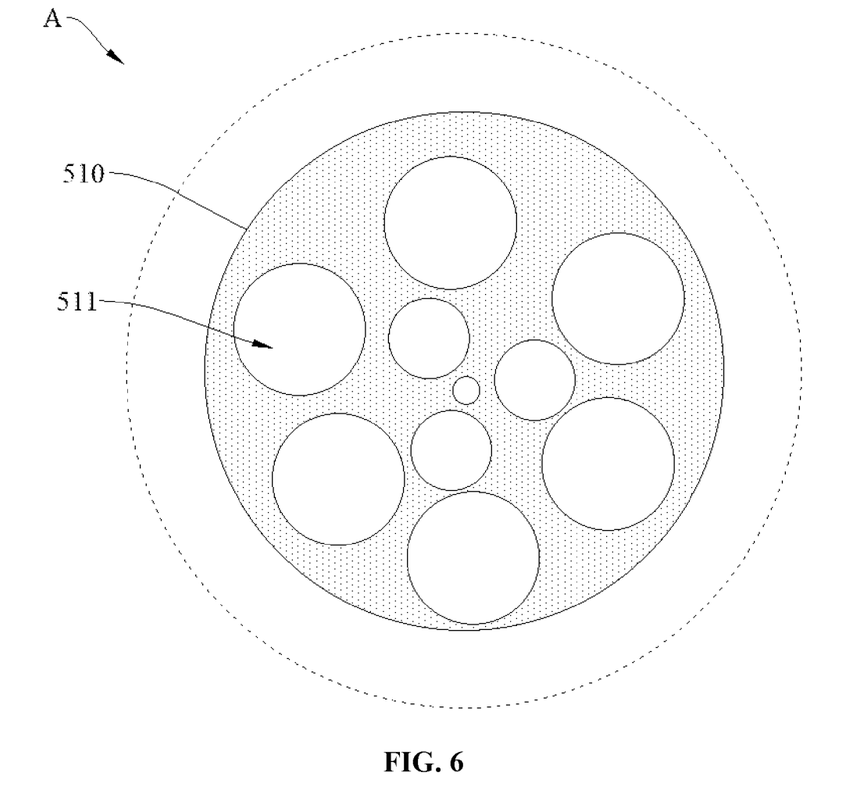
FIG. 6 is a schematic enlarged view of a A region in FIG. 5.

In some embodiments, with reference to FIGS. 1, 5, and 6, the light adjustment units 510 includes a plurality of open holes 511, a light reflectivity of the light adjustment units 510 ranges from 70% to 95%.

The light adjustment units 510 can be a material with a greater reflectivity, for example, metal material. Also, forming the open holes 511 in the light adjustment units 510 can further refine the patterning process and perform reflection and hole diffusion processes to the light by the open holes 511 and reflection characteristics to improve uniformity of the light.

In some embodiments, a light emitting angle of the light emitting chip 310 based on the light adjustment unit 510 of the refined open hole 511 ranges from 140° to 175°.

In some embodiments, with reference to FIGS. 1, 5, and 6, along a direction from an edge of the light adjustment unit 510 to a center of the light adjustment unit 510, diameters of the open holes 511 gradually decrease.

The arrangement of the diameters reflects more center lights to prevent a great difference between center brightness and edge brightness, which further optimizes uniformity of the emitted light of one light emitting chips 310 and improves the display effect.

In some embodiments, with reference to FIGS. 1 and 5, an orthographic projection of the light emitting chip 310 on a corresponding one of the light adjustment units 510 is within the light adjustment units 510, and a transmittance of the light adjustment unit 510 ranges from 5% to 10%.

The light adjustment units 510 can be a material with a lower transmittance, can be a simplified pattern, for example, ink or organic photoresist, performing a light uniform process by blocking and reflecting the light of the light emitting chips 310 to further optimize uniformity of the light emission of the light emitting chips 310 to improve the display effect.

In some embodiments, a light emitting angle of the light emitting chip 310 based on the simplified light adjustment unit 510 ranges from 160° to 170°.

In some embodiments, a thickness of the reflection function layer 600 can range from 1 μm to 50 μm.

In some embodiments, with reference to FIG. 1, the backlight module 100 further includes a light converging layer 800 located on a side of the color conversion layer 700 away from the light emitting assembly 300. The light converging layer 800 includes a plurality of pyramid units 810, bottom surfaces of the pyramid units 810 are located on a side near the color conversion layer 700.

Converging the light by the pyramid units 810 further improves the light emission rate of the light to enhance the display effect.

In some embodiments, the pyramid units 810 can be a quadrangular pyramid structure, and is not limited here.

In some embodiments, the pyramid units 810 can be embossing glue, and a refractive index of the embossing glue is at least 1.6.

In some embodiments, with reference to FIG. 1, the backlight module 100 further includes an underlay 110 located on a side of the driver circuit layer 200 away from the light emitting assembly 300.

In some embodiments, a light emitting angle of the light emitting chip 310 ranges from 140° to 175°. The light emitting chips 310 includes a blue light chip, and a light emitting main wavelength thereof ranges from 445 nm to 460 nm.

In some embodiments, the color conversion layer 700 can be connected to the reflection function layer 600 by a transparent bonding layer, and a material of the transparent bonding layer can be optical clear adhesive, and is not specifically limited here.

The present invention, by disposing a reflection function layer between the color conversion layer and the light emitting assembly, reflects the color light with a longer wavelength emitted from the color conversion layer to the reflection function layer, which increases the light emission rate, improves the light use rate balances the thickness and the light emission rate of the backlight module, and improves the display effect.

Figure 7:
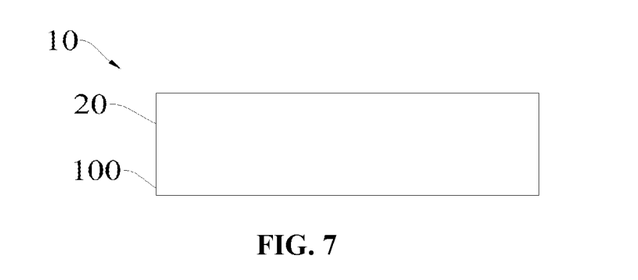
FIG. 7 is a schematic structural view of a display module provided by the present invention embodiment.

With reference to FIG. 7, the present invention embodiment further provides a display module 10 including any one of the above backlight modules 100, and a display panel 20 disposed on the light exiting side of the backlight module 100.

In the present embodiment, the display module 10 can be a liquid crystal display module 10, and can be a self-luminous display module 10. Namely, the backlight module 100 can serve as a backlight module of the liquid crystal display module 10, and also can serve as a display device of the self-luminous display module 10.

In some embodiments, the backlight module 100 can be a self-luminous mode, namely, the driver circuit layer 200 of the backlight module 100 is an array substrate and can directly drive one light emitting chip 310 for display, one light emitting chip 310 corresponds to one sub-pixel.

In some embodiments, the display module 10 can be a liquid crystal display module 10, and the display panel 20 further includes a liquid crystal layer, an array layer, a color filter layer, and upper and lower polarization layers.

Figure 8:
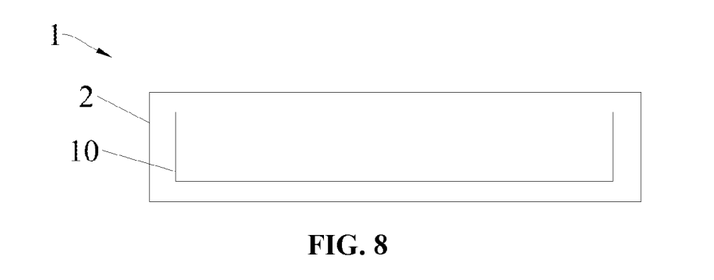
FIG. 8 is a schematic structural view of a display device provided by the present invention embodiment.

With reference to FIG. 8, the present invention embodiment also provides a display device 1, including any one of the above display module 10 and the device main body 2, and the device main body 2 are assembled with the display module 10 integrally.

Specific structures of the display module 10 and the backlight module 100 refer to any of the above embodiments of the display module 10 and the backlight module 100 and attached drawings, which is not described here repeatedly.

In the present embodiment, the device main body 2 can include a middle frame, frame sealant, etc. The display device 1 can be a display terminal such as cell phone, tablet, television, etc., and is not limited here.

The present invention embodiment discloses a backlight module and a display module. The backlight module includes a light emitting assembly, a color conversion layer, and a reflection function layer. The reflection function layer at least includes a first sublayer and a second sublayer. A refractive index of the first sublayer is less than a refractive index of the second sublayer. A light emitted from the color conversion layer to the reflection function layer includes a first light, and the refractive index of the first sublayer is less than the refractive index of the second sublayer. A product of a thickness of the first sublayer and the refractive index of the first sublayer is equal to an integer multiple of a half wavelength of the first light. The present invention, by setting a relation between the first light and a thickness and a refractive index of the reflection function layer, enhances reflectivity of the first light, increases a light emission rate, improves a light use rate, balances the thickness and the light emission rate of the backlight module, and improves a display effect.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A backlight module, comprising:
    a light emitting assembly comprising a plurality of light emitting chips;
    a color conversion layer located on a side of the light emitting assembly; and
    a reflection function layer located between the light emitting assembly and the color conversion layer, wherein the reflection function layer at least comprises a first sublayer and a second sublayer, and the second sublayer is located between the first sublayer and the light emitting assembly;
    wherein light emitted by the color conversion layer to the reflection function layer comprises a first light, a refractive index of the first sublayer is less than a refractive index of the second sublayer, and a product of a thickness of the first sublayer and the refractive index of the first sublayer is equal to an integer multiple of a half wavelength of the first light;
    wherein the reflection function layer further comprises a third sublayer located on a side of the second sublayer away from the color conversion layer;
    the refractive index of the second sublayer is different from a refractive index of the third sublayer;
    wherein the first sublayer comprises a first surface located near the color conversion layer, first reflective lights comprise the first lights reflected by one or more of surfaces of the first sublayer, the second sublayer, and the third sublayer and emitted out from the first surface, at least some of the first reflective lights have peaks at least partially overlapping one another, or at least some of the first reflective lights have valleys at least partially overlapping one another;
    wherein the reflection function layer further comprises a fourth sublayer located on a side of the third sublayer away from the color conversion layer, a refractive index of the fourth sublayer is different from the refractive index of the third sublayer; and
    wherein the light emitted by the color conversion layer to the reflection function layer further comprises second lights, a color of the second lights is different from a color of the first light, second reflective lights comprise the second lights reflected by surfaces of one or more of the first sublayer, the second sublayer, the third sublayer, and the fourth sublayer and emitted out from the first surface, at least some of the second reflective lights have peaks at least partially overlapping one another, or at least some of the second reflective lights have valleys at least partially overlapping one another.

2. The backlight module according to claim 1, wherein the light emitted by the color conversion layer to the reflection function layer further comprises third light, a color of the third light is different from the color of the first light, the color of the third light is different from the color of the second lights, the color of the third light is the same as a light emitting color of the light emitting chips; and
    wherein a transmittance of the reflection function layer relative to the first light is less than or equal to 1%, a transmittance of the reflection function layer relative to the second lights is less than or equal to 1%, and a transmittance of the reflection function layer relative to the third light is greater than or is equal to 85%.

3. The backlight module according to claim 2, wherein the color of the first light is green, the color of the second lights is red, and the color of the third light is blue.

4. The backlight module according to claim 1, wherein the refractive index of the first sublayer is the same as a refractive index of the third sublayer, and a refractive index of the second sublayer is the same as the refractive index of the fourth sublayer.

5. The backlight module according to claim 1, wherein the light emitting assembly further comprises a light reflection barrier wall between adjacent two of the light emitting chips, and a height of the light reflection barrier wall is greater than a height of the light emitting chip.

6. The backlight module according to claim 5, wherein the backlight module further comprises an encapsulation layer located between the light emitting assembly and the reflection function layer and a light adjustment layer located between the encapsulation layer and the reflection function layer; and
    wherein the light adjustment layer comprises a plurality of light adjustment units and filling units each of which is located between adjacent two of the light adjustment units, one of the light adjustment units corresponds to one of the light emitting chips, and a refractive index of the filling unit is the same as a refractive index of the encapsulation layer.

7. The backlight module according to claim 6, wherein the light adjustment units comprises a plurality of open holes, and a light reflectivity of the light adjustment unit ranges from 70% to 95%.

8. The backlight module according to claim 7, wherein along a direction from an edge of the light adjustment unit to a center of the light adjustment unit, diameters of the open holes gradually decrease.

9. The backlight module according to claim 6, wherein the light emitting chips at least partially overlap the light adjustment units, a transmittance of the light adjustment unit ranges from 5% to 10%.

10. The backlight module according to claim 1, wherein the backlight module further comprises a light converging layer located on a side of the color conversion layer away from the light emitting assembly; and
the light converging layer comprises a plurality of pyramid units, a bottom surface of the pyramid units is located near a side the color conversion layer.

11. A display module, comprising a backlight module, and a display panel disposed on a light exiting side of the backlight module;
wherein the backlight module comprises:
a light emitting assembly comprising a plurality of light emitting chips;
a color conversion layer located on a side of the light emitting assembly; and
a reflection function layer located between the light emitting assembly and the color conversion layer, wherein the reflection function layer at least comprises a first sublayer and a second sublayer, and the second sublayer is located between the first sublayer and the light emitting assembly;
wherein light emitted by the color conversion layer to the reflection function layer comprises a first light, a refractive index of the first sublayer is less than a refractive index of the second sublayer, and a product of a thickness of the first sublayer and the refractive index of the first sublayer is equal to an integer multiple of a half wavelength of the first light;
wherein the reflection function layer further comprises a third sublayer located on a side of the second sublayer away from the color conversion layer;
the refractive index of the second sublayer is different from a refractive index of the third sublayer; and
wherein the first sublayer comprises a first surface located near the color conversion layer, first reflective lights comprise the first lights reflected by one or more of surfaces of the first sublayer, the second sublayer, and the third sublayer and emitted out from the first surface, at least some of the first reflective lights have peaks at least partially overlapping one another, or at least some of the first reflective lights have valleys at least partially overlapping one another;
wherein the reflection function layer further comprises a fourth sublayer located on a side of the third sublayer away from the color conversion layer, a refractive index of the fourth sublayer is different from the refractive index of the third sublayer; and
wherein the light emitted by the color conversion layer to the reflection function layer further comprises second lights, a color of the second lights is different from a color of the first light, second reflective lights comprise the second lights reflected by surfaces of one or more of the first sublayer, the second sublayer, the third sublayer, and the fourth sublayer and emitted out from the first surface, at least some of the second reflective lights have peaks at least partially overlapping one another, or at least some of the second reflective lights have valleys at least partially overlapping one another.

12. The display module according to claim 11, wherein the light emitted by the color conversion layer to the reflection function layer further comprises third light, a color of the third light is different from the color of the first light, the color of the third light is different from the color of the second lights, the color of the third light is the same as a light emitting color of the light emitting chips; and
wherein a transmittance of the reflection function layer relative to the first light is less than or equal to 1%, a transmittance of the reflection function layer relative to the second lights is less than or equal to 1%, and a transmittance of the reflection function layer relative to the third light is greater than or is equal to 85%.

13. The display module according to claim 12, wherein the color of the first light is green, the color of the second lights is red, and the color of the third light is blue.

14. The display module according to claim 11, wherein the refractive index of the first sublayer is the same as a refractive index of the third sublayer, and a refractive index of the second sublayer is the same as the refractive index of the fourth sublayer.

15. The display module according to claim 11, wherein the light emitting assembly further comprises a light reflection barrier wall between adjacent two of the light emitting chips, and a height of the light reflection barrier wall is greater than a height of the light emitting chip.

16. The display module according to claim 15, wherein the backlight module further comprises an encapsulation layer located between the light emitting assembly and the reflection function layer and a light adjustment layer located between the encapsulation layer and the reflection function layer; and
wherein the light adjustment layer comprises a plurality of light adjustment units and filling units each of which is located between adjacent two of the light adjustment units, one of the light adjustment units corresponds to one of the light emitting chips, and a refractive index of the filling unit is the same as a refractive index of the encapsulation layer.

17. A backlight module, comprising:
a light emitting assembly comprising a plurality of light emitting chips;
a color conversion layer located on a side of the light emitting assembly; and
a reflection function layer located between the light emitting assembly and the color conversion layer, wherein the reflection function layer at least comprises a first sublayer and a second sublayer, and the second sublayer is located between the first sublayer and the light emitting assembly;
wherein light emitted by the color conversion layer to the reflection function layer comprises a first light, a refractive index of the first sublayer is less than a refractive index of the second sublayer, and a product of a thickness of the first sublayer and the refractive index of the first sublayer is equal to an integer multiple of a half wavelength of the first light;
wherein the light emitting assembly further comprises a light reflection barrier wall between adjacent two of the light emitting chips, and a height of the light reflection barrier wall is greater than a height of the light emitting chip;
wherein the backlight module further comprises an encapsulation layer located between the light emitting assembly and the reflection function layer and a light adjustment layer located between the encapsulation layer and the reflection function layer; and
wherein the light adjustment layer comprises a plurality of light adjustment units and filling units each of which is located between adjacent two of the light adjustment units, one of the light adjustment units corresponds to one of the light emitting chips, and a refractive index of the filling unit is the same as a refractive index of the encapsulation layer.

18. The backlight module according to claim 17, wherein the light adjustment units comprises a plurality of open holes, and a light reflectivity of the light adjustment unit ranges from 70% to 95%.

19. The backlight module according to claim 18, wherein along a direction from an edge of the light adjustment unit to a center of the light adjustment unit, diameters of the open holes gradually decrease.

20. The backlight module according to claim 17, wherein the light emitting chips at least partially overlap the light adjustment units, a transmittance of the light adjustment unit ranges from 5% to 10%.

\* \* \* \* \*